Sept. 9, 1952      R. W. BRADLEY      2,609,554
NAIL CUTTING MACHINE

Filed Aug. 24, 1951      2 SHEETS—SHEET 1

Inventor
Robert W. Bradley
By his Attorney

Sept. 9, 1952 — R. W. BRADLEY — 2,609,554
NAIL CUTTING MACHINE
Filed Aug. 24, 1951 — 2 SHEETS—SHEET 2

Inventor
Robert W. Bradley
By his Attorney

Patented Sept. 9, 1952

2,609,554

UNITED STATES PATENT OFFICE 2,609,554

NAIL CUTTING MACHINE

Robert W. Bradley, Marblehead, Mass., assignor to United Shoe Machinery Corporation, Flemington, N. J., a corporation of New Jersey Application August 24, 1951, Serial No. 243,460

5 Claims. (Cl. 12—84)

1

This invention relates to nail cutting machines, and is herein illustrated as embodied in a machine for cutting off upstanding portions of nails or tacks in the insoles of shoes.

In nailing heels onto shoes it frequently happens that the nails extend through the insole and project above it forming a hazard to a person putting on the shoe. It is an object of this invention to provide a machine comparatively simple in construction which is effective to cut off such nails substantially flush with the insole in such manner that they will no longer form objectionable obstructions.

To this end, and as herein illustrated, the invention provides a nail cutting machine in which there is an elongated sleeve terminating at one end in a fixed cutting blade, a spindle mounted within the sleeve and having at one end a movable cutting blade adjacent to the end of the sleeve and angularly spaced from the fixed blade, there being power means for actuating the spindle in a direction to force the movable blade toward the fixed blade in a cutting operation, and a spring for returning the movable blade in the opposite direction into inoperative position. The mounting of the cutting blades at the end of an elongated sleeve facilitates presentation of a shoe in operative relation to the blades and by moving the shoe along the end of the sleeve upstanding nails to be cut off can readily be located in the space between the blades. Preferably, and as shown, the power means for actuating the spindle is a solenoid operable by a pulse of electric current and which is effective to apply the peak power available to the spindle during the cutting operation with the result that a nail located between the blades is cleanly cut off at the upper surface of the insole in such manner that no further treatment of the nail such as by burnishing is required.

These and other features of the invention are disclosed in the following specification and in the accompanying drawings, and are pointed out in the claims.

2

Figure 3:
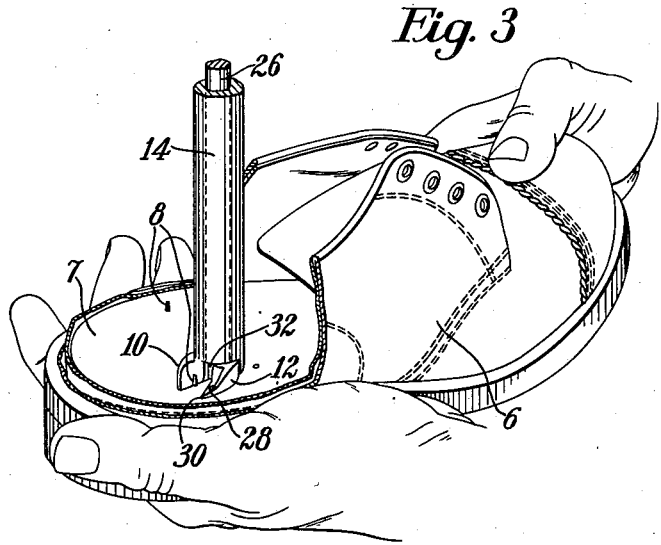
Fig. 3 is a perspective view partly in section, illustrating the operation of the machine upon a shoe.

The machine is designed for operation upon shoes such as shoe 6, Fig. 3, having an insole 7, through which project end portions of heel attaching nails 8, cooperating cutting blades 10 and 12 being provided for severing the nails substantially flush with the upper surface of the insole.

Figure 1:
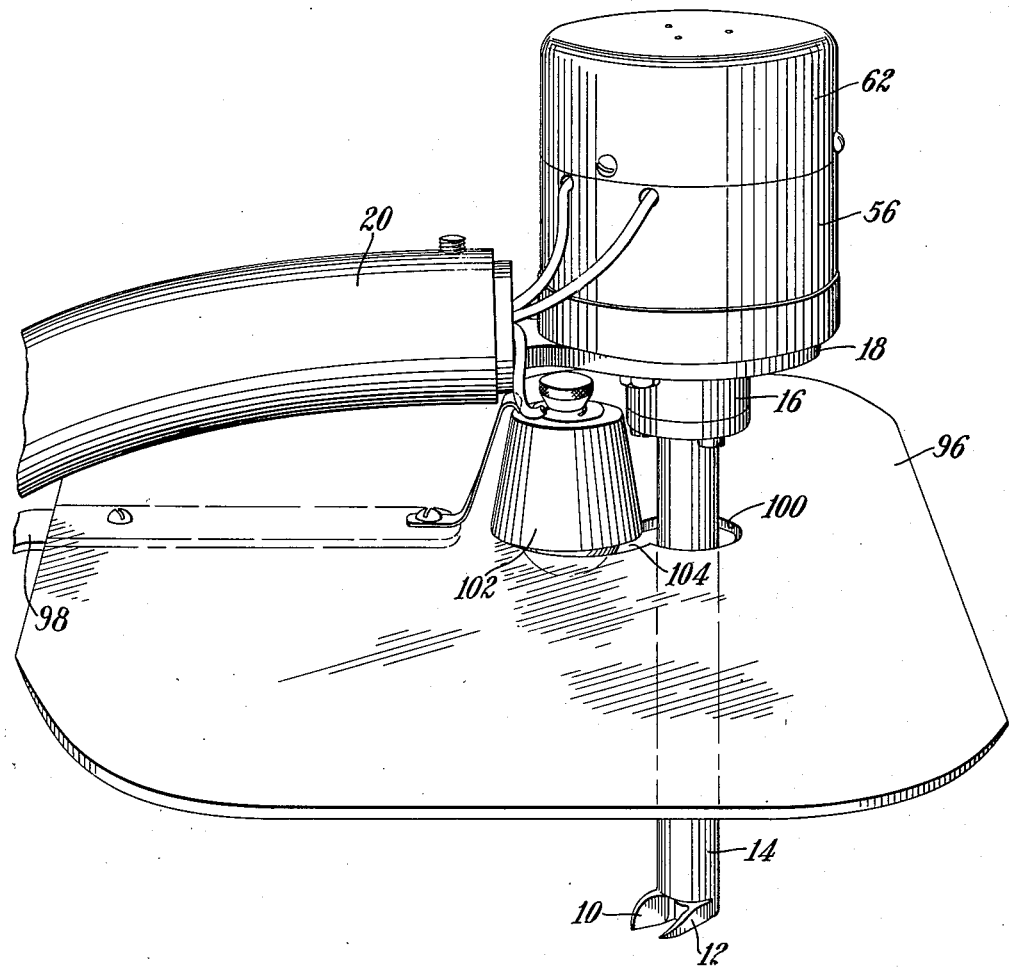
Fig. 1 is a perspective view of a nail cutting machine constructed in accordance with one embodiment of the invention.

As illustrated in Fig. 1 the cutting blades 10 and 12 are carried at the lower end of an elongated vertical sleeve 14 depending from a casing 16 conveniently supported by a bracket 18 on an arm 20.

Figure 2:
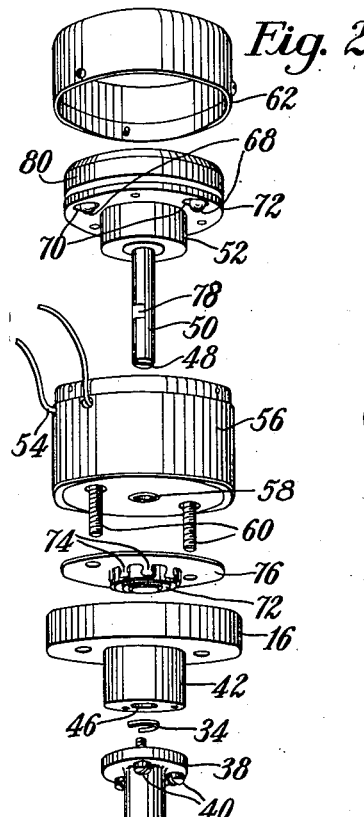
Fig. 2 is an exploded view in perspective, showing various parts of the machine.

The blade 10, Figs. 1, 2 and 3, is formed integral with the sleeve at the lower end thereof, extends outwardly from the sleeve, and has a face 22 inclined to the vertical and terminating in a horizontal cutting edge 24, Fig. 2.

The blade 12 which is the movable blade, is integral with the lower end of a spindle 26. The blade projects outwardly of the spindle and has an inclined face 28 terminating in a horizontal cutting edge 30.

The spindle 26 is assembled within the sleeve 14 with the faces of the blades disposed toward each other and their cutting edges in alinement as shown in Fig. 3, the blade 12 extending out of the sleeve through an arcuate opening 32. This opening is of sufficient width as to permit angular movement of about 25°, of the spindle and blade, the movement being limited by interengagement of the cutting edges of the blades in one direction and by engagement of the back of the blade 12 with the wall of the opening in the other direction. Axial movement of the spindle in the sleeve is prevented by a retaining ring 34, Fig. 2, which enters a groove 36 near the upper end of the spindle and bears against a flange 38 on the sleeve.

The sleeve 14 with the spindle 26 positioned within it is secured to the casing 16 by screws 40 which extend through the flange 38 on the sleeve and into a boss 42 depending from the casing.

The upper end of the spindle 26 is slabbed off forming a key 44 which extends upwardly through a bore 46 in the boss 42 and into a slot 48 in a shaft 50 which forms part of mechanism for oscillating the blade 12.

Figure 4:
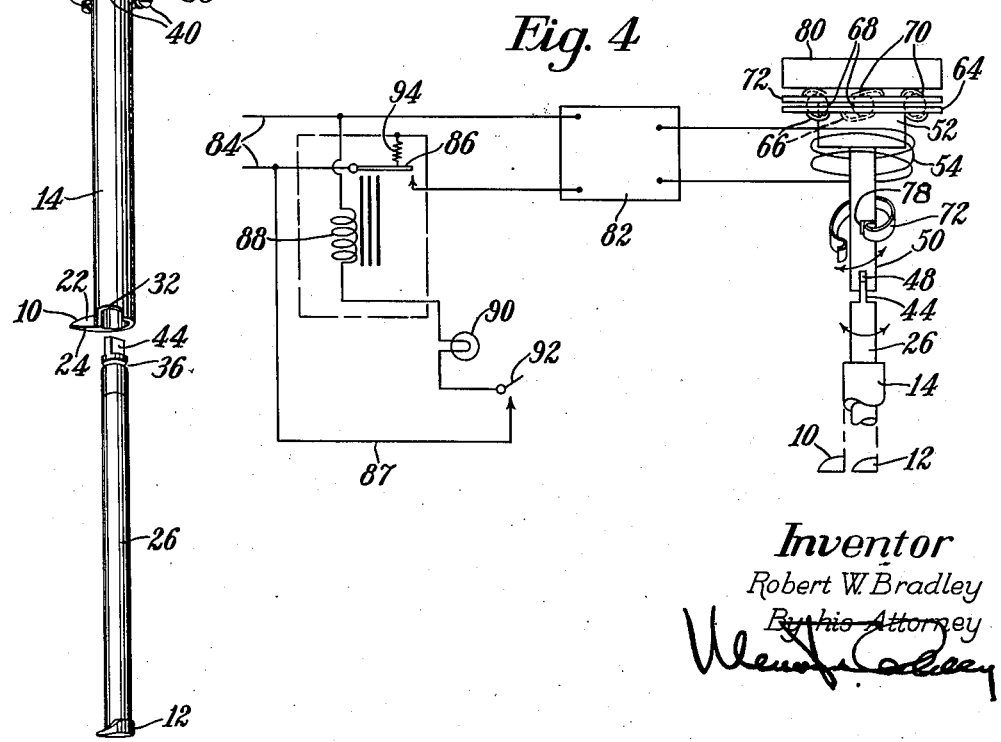
Fig. 4 is a diagrammatic view of the machine including the electric circuits employed.

This mechanism includes a rotary solenoid of any suitable construction such as can be purchased on the market. One form of rotary solenoid is illustrated in Figs. 2 and 4, and comprises an armature 52 positioned within a coil 54 normally located within a sleeve 56. The armature carries the shaft 40 which extends downwardly through an opening 58 in the sleeve 56 which is secured to the casing 16 by screws 60, the upper end of the sleeve being closed by a cap 62.

The armature 52 is supported by a plate 64 loosely surrounding the armature and fixed within the sleeve 56 and having downwardly inclined recesses 66 along its periphery for receiving ball bearings 68 which project above the plate 64 into upwardly inclined recesses 70 in a plate 72 secured to the armature. This construction is such that when the coil 54 is energized the armature is pulled downwardly and under the cam action of the ball bearings 68 and recesses 66 and 70 the armature is rotated in a clockwise direction, Fig. 4, effecting angular movement of the spindle 26 by means of the key and slot connection 44, 46 thus to move the blade 12 into engagement with the fixed blade 10.

Mechanism is provided for returning the blade 12 to inoperative position after a cutting operation. This is accomplished by a coil spring 72 mounted within depending projections 74 on a plate 76 below the coil 54. The spring surrounds the shaft 50 and has one end engaged in a recess 78 in the shaft and the other end embracing one of the projections 74. Thus after the coil is de-energized the spring 72 is effective to rotate the shaft in a contraclockwise direction, Fig. 4, effecting a return of the blade 12 to a position at the far side of the recess 32.

In order to improve the cutting action of the blades, use is made of an inertia weight 80 which is secured to the upper end of the armature 52. This weight serves to store up energy during the initial rotative movement of the armature and such energy is applied when it is most needed during the actual cutting operation to force the blades through a nail.

The solenoid is energized by direct current from a rectifier 82, Fig. 4, supplied with alternating current from power lines 84 through a time controlled relay 86. The relay is operated by a circuit 87, from the power lines 84, including a solenoid 88, a timer 90, in this instance a tungsten filament bulb, and a switch 92 in series. The circuit to the rectifier is normally held open by spring 94 which holds the relay up. However, when the switch 92 is closed the coil 88 is energized closing the relay and passing current to the rectifier. As the tungsten bulb heats up the resistance in its circuit increases until the spring 94 overcomes the pull of the solenoid and the circuit through the relay is broken. This circuit operates to prevent overloading of the solenoid and makes it feasible to use a smaller solenoid than would otherwise be the case.

By utilizing a pulsed current the solenoid is supplied with high peaked power and the torque on the spindle 26 and, consequently, on the movable blade 12, is substantially constant during the cutting operation of the blade.

The machine is provided with a transparent plastic guard 96 supported by a bracket 98 carried by the arm 20. The guard extends horizontally in a plane somewhat below the casing 16 and has an opening 100 through which the sleeve 14 passes. The guard permits a clear view of the work presented to the cutting blades while, at the same time, prevents cut pieces of nails from flying into the face of an operator.

The bracket 98 also carries a lamp 102 which extends through an opening 104 in the guard into position to illuminate the work.

In the operation of the machine a shoe 6, Fig. 3, is brought up against the lower end of the sleeve 14 with the sleeve positioned in the heel portion of the shoe and the latter is shifted until an upstanding nail is located between the blades 10 and 12, and preferably, against the fixed blade 10. Actuation of the switch 92 causes operation of the solenoid 54 as above set forth with the result that the nail is severed by the action of the cooperating blades.

While the invention is primarily concerned with the cutting off of the ends of heel attaching nails projecting above the insole of a shoe it is contemplated that the machine described is adapted to use in cutting other nails or tacks such as lasting tacks which are sometimes present in lasted shoes.

Having thus described my invention what I claim as new and desire to secure by Letters Patent of the United States is:

1. A nail cutting machine comprising an elongated sleeve, a fixed cutting blade secured to one end of the sleeve and projecting outwardly therefrom, a spindle rotatably mounted in the sleeve, the sleeve having an arcuate opening in the end thereof adjacent to the fixed blade, a movable blade secured to the spindle and projecting outwardly through the opening, power means for moving the spindle angularly in a direction to cause engagement of the blades, and a spring to effect movement of the movable blade in the opposite direction.

2. A nail cutting machine comprising an elongated sleeve, a fixed cutting blade secured to one end of the sleeve, a spindle rotatably mounted within the sleeve, a cutting blade carried by the spindle in alinement with the fixed blade, power means for moving the spindle angularly in a direction to cause engagement of the blades, and a spring for moving the spindle in the opposite direction.

3. A nail cutting machine comprising an elongated sleeve having at one end a fixed cutting blade, a spindle mounted in the sleeve and having at its one end a movable cutting blade in lateral alinement with the fixed blade, a solenoid for rotating the movable blade in a direction toward the fixed blade and a spring for rotating the movable blade in the opposite direction.

4. A nail cutting machine comprising a vertically extending support terminating in a fixed cutting blade, a movable blade in lateral alinement with the fixed blade and mounted for movement about the axis of the support, a solenoid for effecting movement of the movable blade from an inoperative position into engagement with the fixed blade, and a spring for returning the movable blade to inoperative position.

5. A nail cutting machine comprising a vertically extending member terminating in a fixed cutting blade, a movable cutting blade cooperable with the fixed blade for cutting nails projecting from the insoles of shoes, means for mounting the movable blade for oscillation relatively to the fixed blade, a rotary solenoid having an armature for forcing the movable blade in a direction toward the fixed blade, a spring for returning the movable blade to inoperative position, and an inertia weight secured to the armature of the solenoid.

ROBERT W. BRADLEY.

No references cited.